(12) United States Patent
Lohman et al.

(10) Patent No.: US 6,345,267 B1
(45) Date of Patent: Feb. 5, 2002

(54) METHOD AND SYSTEM FOR LOOK AHEAD QUERY EVALUATION PLANNING BASED ON INTERESTING PARTITION PROPERTIES

(75) Inventors: Guy Maring Lohman; Eugene Jon Shekita; David E. Simmen, all of San Jose; Monica Sachiye Urata, Saratoga, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/517,355

(22) Filed: Mar. 2, 2000

Related U.S. Application Data

(63) Continuation of application No. 08/885,073, filed on Jun. 30, 1997, now Pat. No. 6,092,062.

(51) Int. Cl.[7] .............................................. G06F 17/30
(52) U.S. Cl. ........................ 707/2; 707/3; 707/4; 707/5; 707/103
(58) Field of Search ..................... 707/1–10, 100–104, 707/200–206

(56) References Cited

U.S. PATENT DOCUMENTS

| | | | | |
|---|---|---|---|---|
| 5,301,317 A | * | 4/1994 | Lohman et al. ............... 707/2 |
| 5,325,525 A | * | 6/1994 | Shan et al. .................. 395/674 |
| 5,440,727 A | * | 8/1995 | Bhide et al. ................. 711/117 |
| 5,548,754 A | * | 8/1996 | Pirahesh et al. ............... 707/2 |
| 5,551,027 A | * | 8/1996 | Choy et al. .................. 707/201 |
| 5,619,692 A | | 4/1997 | Malkemus et al. ............ 707/2 |
| 5,717,919 A | * | 2/1998 | Kodavalla et al. ........... 395/608 |
| 5,742,806 A | * | 4/1998 | Reiner et al. ................ 395/600 |
| 5,745,746 A | * | 4/1998 | Jhingran et al. ............... 707/2 |
| 5,765,146 A | * | 6/1998 | Wolf et al. .................... 707/2 |
| 5,774,692 A | * | 6/1998 | Boyer et al. ................. 395/500 |
| 5,822,747 A | * | 10/1998 | Graefe et al. .................. 707/2 |
| 5,822,750 A | * | 10/1998 | Jou et al. ....................... 707/2 |
| 6,092,062 A | * | 7/2000 | Lohman et al. ................ 707/2 |

OTHER PUBLICATIONS

Dietrich, Suzanne Wagner et al., An application of fragmentation transparency in a distributed databases systems: A case study, the journal of systems software, vol. 35, Issue: 3, pp 185–197, Dec. 1996.*

C.J. Date in *An Introduction to Database Systems*, 6th Ed., 1995, pp. 12, 349,350,353 & 367.

* cited by examiner

*Primary Examiner*—Jack Choules
*Assistant Examiner*—Srirama Channavajjala
(74) *Attorney, Agent, or Firm*—Sawyer Law Group LLP; Ingrid Foerster

(57) ABSTRACT

A relational data base management system includes a query processor that uses a query operator partition property to perform QEP pruning and to ensure that data input to a query operator is partitioned appropriately for the operation. The partition property indicates the group of network nodes across which a table is distributed. The query processor also makes use of partition classes that are designated "interesting classes" to perform preoptimization planning and query pruning, and to perform look-ahead partitioning based on partition classes that are identified as being of interest to future operations, thereby more efficiently evaluating complex query statements in an MPP, shared-nothing environment.

11 Claims, 9 Drawing Sheets

METHOD AND SYSTEM FOR LOOK AHEAD QUERY EVALUATION PLANNING BASED ON INTERESTING PARTITION PROPERTIES

This application is a continuation of prior application Ser. No. 08/885,073 filed on Jun. 30, 1997 now U.S. Pat. No. 6,092,062.

BACKGROUND OF THE INVENTION

1. Field of the Invention

This invention relates generally to database management systems and, more particularly, to efficient evaluation of SQL statements processed in relational database management systems.

2. Description of the Related Art

Information is frequently stored in computer processing systems in the form of a relational database. A relational database stores information as a collection of tables having interrelated columns and rows. A relational database management system (RDBMS) provides a user interface to store and retrieve the information and provides a query methodology that permits table operations to be performed on the data. One such RDBMS is the Structured Query Language (SQL) interface, which is specified by standards adopted by the American National Standards Institute (ANSI) and the International Standards Organization (ISO) following original development work by the International Business Machines (IBM) Corporation. The SQL interface permits users to formulate operations on the data tables either interactively, or through batch file processing, or embedded in host languages such as C, COBOL, or the like.

In particular, SQL provides table operations with which users can request database information and form one or more new tables out of the operation results. Data from multiple tables, or views, can be linked to perform complex sets of table operations with a single statement. The table operations are specified in SQL statements called queries. One typical SQL operation in a query is the "SELECT" operation, which retrieves table rows and columns that meet a specified selection parameter. Another operation permitted by SQL is the "JOIN" operation, which concatenates all or part of two or more tables to create a new resulting table. For example, a query might produce a table that contains the names of all supervisory employees who live in a given city, and might do so by specifying a SELECT operation to retrieve employee names and resident cities from one table, and then performing a JOIN of that data after a SELECT operation to retrieve employee names and job titles from another table.

Evaluation of SQL Statements

An SQL query generally includes at least one predicate, which is an SQL expression that can assume a logical value of TRUE, FALSE, or UNKNOWN. A predicate typically either specifies a data range, tests for an existence condition, tests for equivalence, or performs a similar table comparison operation. SQL queries and their resulting table operations can be nested through several levels of predicates such that a higher nested predicate, or level of operation, cannot be evaluated until after a lower level predicate, or operation, has been evaluated. A lower level of SQL operation in an SQL statement is generally referred to as a subquery. An example of an SQL query is provided below in Table 1:

Table 1

SELECT A.y, sum (B.y)
FROM A, B
WHERE A.x=B.x
   GROUP BY A.y;

Those skilled in the art will understand that the notation "A.y" indicates the y column for all rows of Table A.

The Query Graph Model

When a query is input to an RDBMS, it is received by a query processor that puts the query through a query optimization process. The optimization is generally performed by a query optimizer of the RDBMS. During query optimization, the SQL query is parsed, or rewritten, into an RDBMS internal representation referred to as the query graph model (QGM). The QGM is a high-level, graphical representation of the input query in which boxes represent relational operations and arcs connecting the boxes represent quantifiers that reference tables. A QGM representation of the Table 1 query is shown in FIG. 1. The three boxes represent the three subqueries that make up the query of Table 1 and indicate operations that are executed on incoming data, which flows from bottom to top. The arcs represent quantifiers that in some way restrict the information flowing into the respective boxes. The QGM representation of FIG. 1 can best be understood by matching each QGM box from the bottom up. Thus, the "select . . . from A, B" subquery corresponds to the two arcs A and B, respectively, and the "A.y, sum(B, y)" is indicated by the quantifier arc. The subquery "where A.x=B.x" corresponds to the bottom QGM box and the "group by A.y" is represented by the middle box. The final SELECT box in FIG. 1 represents the retrieval of data satisfying the query.

In general, each box of the QGM includes the predicates applied by the box relational operation and is associated with characteristics such as an input or output order specification where appropriate, a "distinct" flag, and the like. A basic set of QGM boxes from which queries can be represented includes SELECT, GROUP BY, and UNION. Join operations are represented by a SELECT box with two or more input quantifiers, whereas the ORDER BY operation is represented by a SELECT box with an output order specification. As part of the query optimization processing, the original QGM can be transformed into a more efficient QGM using techniques such as conversion heuristics, predicate push-down, view merging, and subquery-to-join transformation. The transformed QGM is semantically equivalent to the original QGM, but can be more efficiently evaluated by the query processor.

After the QGM is generated and optionally transformed, cost-based optimization is performed in which the QGM is graphically traversed and a query execution plan (QEP) is generated for evaluation. The RDBMS query processor interprets the QEP and thereby executes it, retrieving the requested data. The QEP can be viewed as a dataflow graph of operators, where each node of the graph corresponds to a relational operation such as a JOIN or a relatively low level operation such as a SORT. Each operator consumes one or more input records (that is, tables) and produces an output set of records (more tables). These tables will be referred to generally as output streams. A QEP representation of the Table 1 query is shown in FIG. 2.

FIG. 2 shows that a QEP graphical representation includes circular or oval objects that represent operators, connected by arcs that represent information streams. Thus, in FIG. 2 a table scan operator that acts on Table A produces information that is fed to a "join" oval, along with information from a table scan operator that acts on Table B. After the JOIN operator, which generates the output corresponding to the "where A.x=B.x" clause of the SQL query, the information stream flows into the "sort" oval, and then the information stream flows into the "group by" oval.

Each stream in a QEP has an associated set of properties. Properties are what characterizes the information that is being moved between operations. Examples of properties include the columns that make up each record in the input stream, the set of predicates that have been applied to the stream, and the order of the stream. Each operator in a QEP determines the properties of its output stream. The properties of an operator's output stream are a function of its input stream and its applied operation. For example, a sort operator passes on all the properties if its input stream unchanged except for the order property and cost.

A QEP is generated, or built, from the bottom up by the query optimizer, operator by operator, using the QGM as a guide. A set of properties are computed for each operator, and as the QEP is built, the optimizer matches the QEP's properties against requirements on those properties. The requirements can arise from the SQL query or from the characteristics of operators, such as JOIN. For example, a query with an ORDER BY clause results in an "order" requirement. If a QEP did not already satisfy the order dictated by the ORDER BY clause, then a sort operation would be added to the QEP to satisfy the ordering requirement of the ORDER BY operator.

As a QEP is built, different plan alternatives for operators are generated and compared. An analytical cost model is typically used to estimate the execution time of a QEP and thereby reflect the resource cost of the QEP. The QEPs are compared on the basis of resource cost using known techniques, and the more costly QEPs are pruned, or discarded, from further consideration. In this way, the output of the query optimizer should be the least costly QEP.

During the pruning process, only QEPs with similar properties are compared to each other. For example, if P1 and P2 are two QEPs being compared, and if "<=" is the symbol meaning that a first property is less general or equivalent to a second property, then P2 prunes P1 (P2 is kept and P1 is discarded) if it is true that P2.cost<=P1.cost, and if for every property x, P1.x<=P2.x. That is, P1 is pruned if it costs more than P2 (P2.cost<=P1.cost) and if all of its properties are less general (P1.x<=P2.x). As a further example, if P1 was sorted on column x, and if P2 was sorted on columns x and y, then the order of P1 is less than (less general than) the order of P2, written as: P1.order<=P2.order. That is, the statement "P1.order<=P2.order" is true because the order property of P1 is less general than the order property of P2, so it cannot be used to satisfy an order requirement for x and y. It should be noted that the definition of "<=" varies from property to property.

Parallel Machine Architecture

In an MPP system with a shared-nothing architecture, a collection of processors comprise nodes of a network and are used to execute queries in parallel. In such a system, a given query is broken up into subtasks and all subtasks are executed in parallel. Nodes in an MPP, shared-nothing system are typically connected by high-speed communication lines over which subtasks are coordinated across nodes. That is, the network is used to coordinate subtasks across nodes and also to exchange data between nodes. Each node has its own memory and disk. To permit such parallel operation, the data tables are horizontally partitioned across nodes. Access to a partition is given only through the node that manages that partition.

The rows of a table are typically assigned to a node by applying some deterministic partitioning function to a subset of the table's columns. These columns are called the partitioning key of the table. A simple example illustrating how a table might be horizontally partitioned is shown in FIG. 3, in which a table called "Table A" has been partitioned. In particular, Table A has been partitioned on column A.x, because rows are assigned to node 0 or to node 1 depending on the value in column x of Table A. The partitioning function assigns the rows of Table A to node 0 or to node 1. Rows with even values in A.x are assigned to node 0, while rows with odd values in A.x are assigned to node 2. Thus, the partitioning key is A.x. A partitioning function is typically based on a simple hashing scheme such as this.

Query Optimization for MPP Systems

Optimizing SQL queries in an MPP, shared-nothing architecture system in which subtasks are executed in parallel is more complicated as compared to simpler, single processor systems in which tasks can be executed serially. One consideration for the MPP system is that the query processor must determine how to break the QEP into subtasks and then must determine how to merge the results of those subtasks for delivery to an end user. As noted above, as the QEP is built, properties are computed for each operator and those properties are associated with various requirements. One of the properties conventionally used is called the ordering property. This property relates to the order in which the rows of a table are maintained. It should be understood that the ordering property is changed during query evaluation, such as by sorting operations. It is known to provide a query optimizer that can consider changes in the ordering property in evaluating QEPs.

Because MPP, shared-nothing systems are more complicated in terms of query evaluation and execution, it would be advantageous to provide a query optimizer that can consider properties in addition to table order when formulating QEP selection. This would promote more efficient pruning of alternative QEPs.

From the discussion above, it should be apparent that there is a need for a relational database management system that efficiently evaluates complex query statements in an MPP, shared-nothing environment by careful consideration of query operator properties in addition to table ordering. The present invention fulfills this need.

SUMMARY OF THE INVENTION

The present invention provides a relational database management system (RDBMS) with a query processor that uses the partition property to perform QEP pruning based on considerations derived from the partition property. The query processor also makes use of partition classes that are designated "interesting classes" to perform preoptimization planning and query pruning, and to perform look-ahead partitioning based on partition classes that are identified as being of interest to future operations. In this way, the relational database management system more efficiently evaluates complex query statements in an MPP, shared-nothing environment.

In one aspect of the invention, the partition property maintained by the query processor includes identification of the nodes over which tables are partitioned and includes information about the function used to assign table rows to nodes, with optional indicators of special circumstances such as an indication that all rows of an intermediate result table will be sent to a single node or an indication that a copy of each table row was sent to each partition node. The query processor makes use of the partition property information to compare alternative QEPs for pruning such that the query processor will prune the QEP having the less general partition property value and having the greater execution cost.

In another aspect of the invention, processing prior to QEP generation permits the query processor to look ahead and consider interesting partition classes, which are defined to be any partitioning of the data that may prove useful for executing a query. In this way, the query processor can determine if a query operator has a partition property that has been designated an interesting partition property, such that the QEP having that query operator may be retained, though it might otherwise be pruned. Properties designated to be interesting are those properties determined to be potentially of good use in executing a query so that overall efficiency of table operations may be increased. Similarly, looking ahead may be used to control partitioning of a table to consider future table operations in determining where to send the output of table partitioning, again increasing efficiency of table operations.

Other features and advantages of the present invention should be apparent from the following description of the preferred embodiment, which illustrates, by way of example, the principles of the invention.

DESCRIPTION OF THE PREFERRED EMBODIMENT

Figures 1, 2:
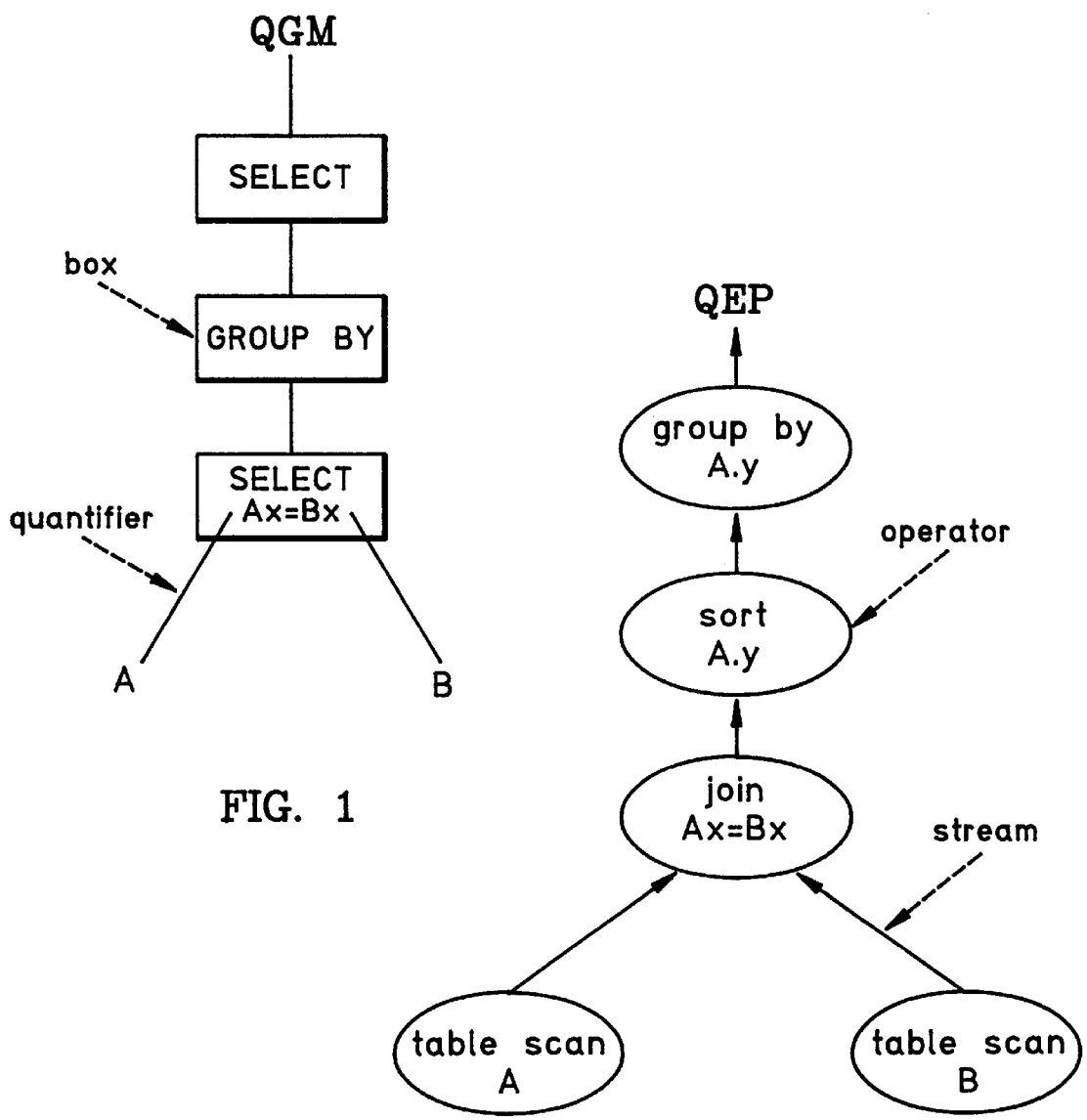
FIG. 1 is a query graph model (QGM) representation of the SQL query listed in Table 1.
FIG. 2 is a query evaluation plan (QEP) representation of the SQL query listed in Table 1.
Figure 3:
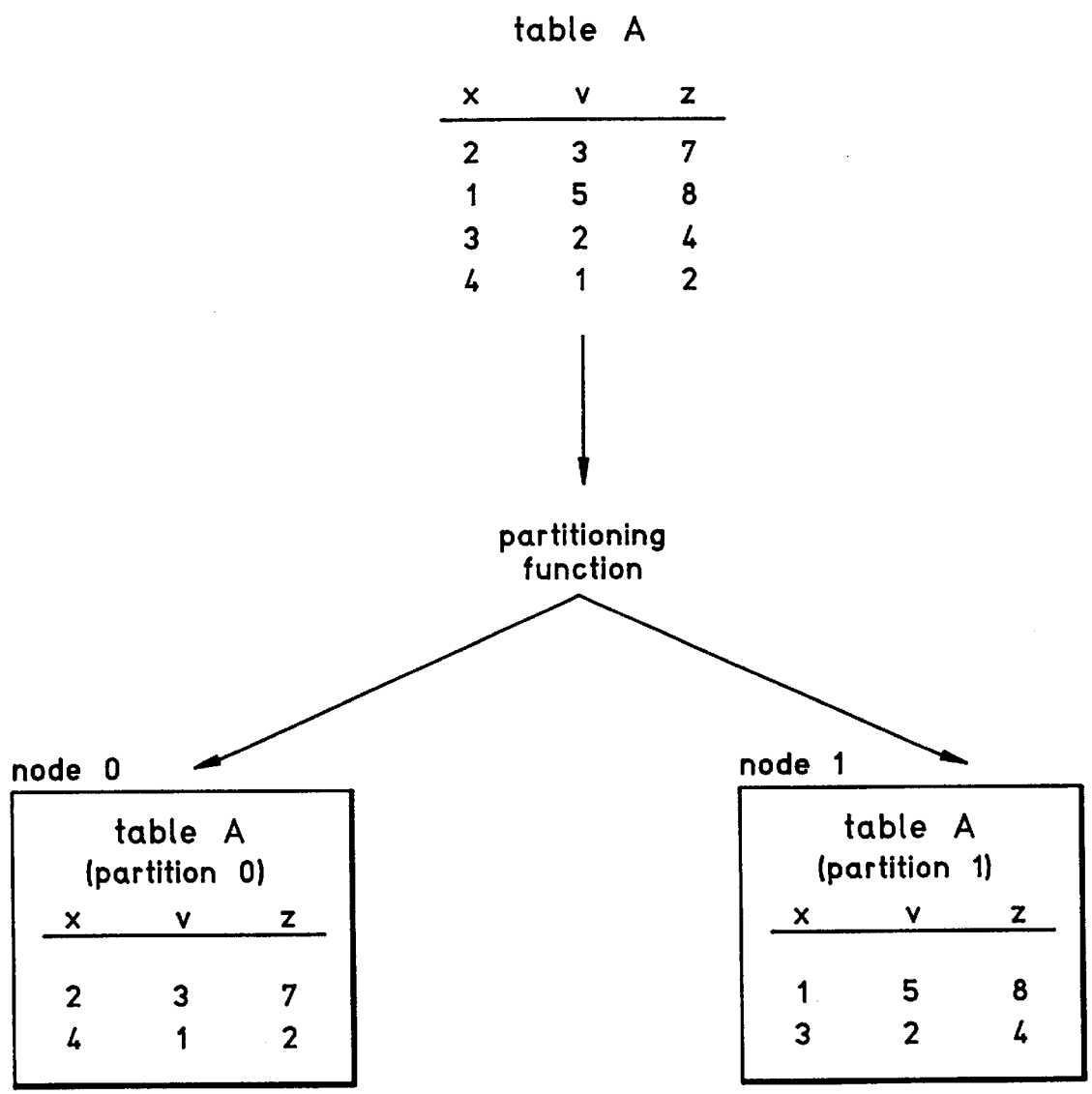
FIG. 3 is an illustration that shows how a Table A is horizontally partitioned across two nodes.
Figure 4:
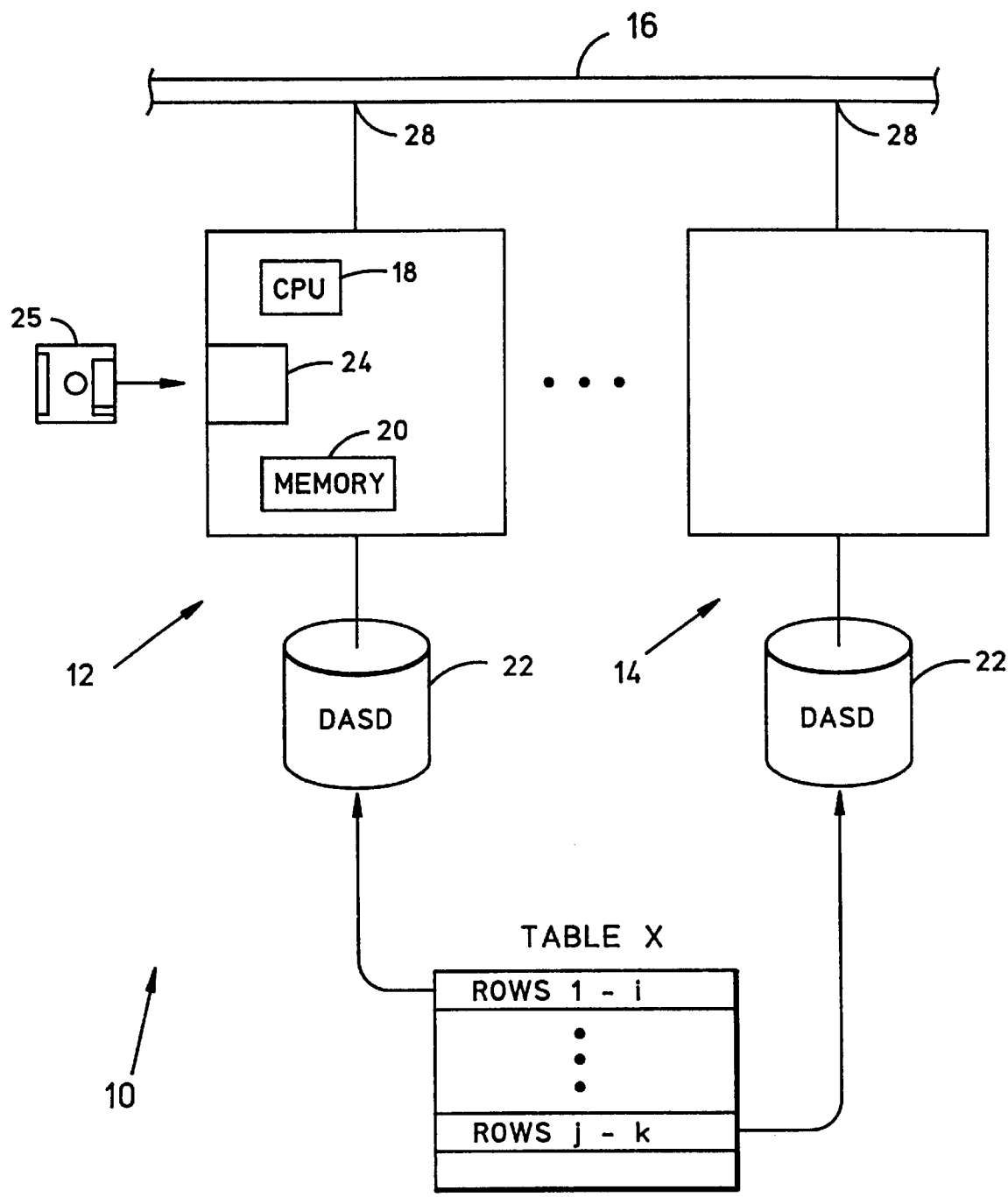
FIG. 4 is a representation of a computer network system constructed in accordance with the present invention.

FIG. 4 illustrates an exemplary computing system 10 constructed in accordance with the present invention. The system includes multiple computers, two of which 12, 14 are shown, connected to a communication network 16 in a massively parallel processing (MPP) shared-nothing configuration. Each of the computers 12, 14 has a similar construction, so that details described with respect to one computer will be understood to apply to all computers of the system. Each computer includes a central processing unit (CPU) 18, an operating main memory 20, and a local direct access storage device (DASD) 22, such as a disk drive. Each computer communicates with the others via the network 16, thereby comprising a network node.

The DASD units 22 of each computer contain table data that comprise a relational data base management system (RDBMS). An application program provides an RDBMS interface to the users and can reside in each computer 12, 14 or can be installed on a single file server computer of the network. In either case, data files of the RDBMS are partitioned across the DASD units of the network. Thus, a Table X of the RDBMS shown in FIG. 4 having multiple rows is stored across the computers of the network 16 such that rows 1 through i, for example, are stored in DASD of the first computer 12, rows j through k are stored in DASD of the second computer 14, and the remaining rows are stored in other computers (not illustrated). In this way, each table is stored across a set of the network nodes.

In the preferred embodiment, the RDBMS interface comprises an SQL system stored in operating memory 20 of each machine. A user at a computer of the network 16 can pose a query for solution by an SQL query processor of the RDBMS. The query is received by the query processor, is transformed into a query graph model (QGM) representation, and is then optimized into a query evaluation plan (QEP). As the QEP is generated, properties are computed for each query operator and those properties are associated with query operator requirements. In accordance with the preferred embodiment of the present invention, the query processor maintains a partition property as one of the query operator properties that are considered during query optimization, such that the partition property characterizes how the rows produced by the associated query operator, and all of its inputs, are physically partitioned across the network. The query optimizer can consider the partition property in performing QEP pruning and in performing look-ahead partitioning. In this way, the RDBMS efficiently evaluates complex query statements in an MPP, shared-nothing environment.

Network Configuration

Each computer CPU 18 performs its functions by executing instructions stored in the operating memory 20. The instructions can be received through an optional storage drive 24, from the DASD 22, or through an interface with the network 16. The storage drive permits a program product storage device 26 to be received and for program steps recorded on the program product storage device to be read and transferred into the operating memory 20. In this way, the processing steps necessary for operation in accordance with the invention can be embodied on a program product. Those skilled in the art will appreciate that the program products can comprise machine-readable storage devices 26 such as magnetic media disks on which are recorded program instructions whose execution implements the RDBMS of the present invention. The storage devices 26 also can comprise, for example, media such as optical disks and other machine-readable storage devices. Other suitable program product storage devices can include magnetic tape and semiconductor memory. Alternatively, the program steps can be received into the operating memory 20 from the DASD 22, or over the network 16. In the latter method, the computer system also includes a network interface 28 that permits communication between the CPU 18 at the first node 12 and other computer systems 14 over the network 16. In that way, the computer system 12 can receive data into the main memory 20 through the interface 28 after network communication has been established by well-known methods that will be understood by those skilled in the art without further explanation.

RDBMS Configuration

Figure 5:
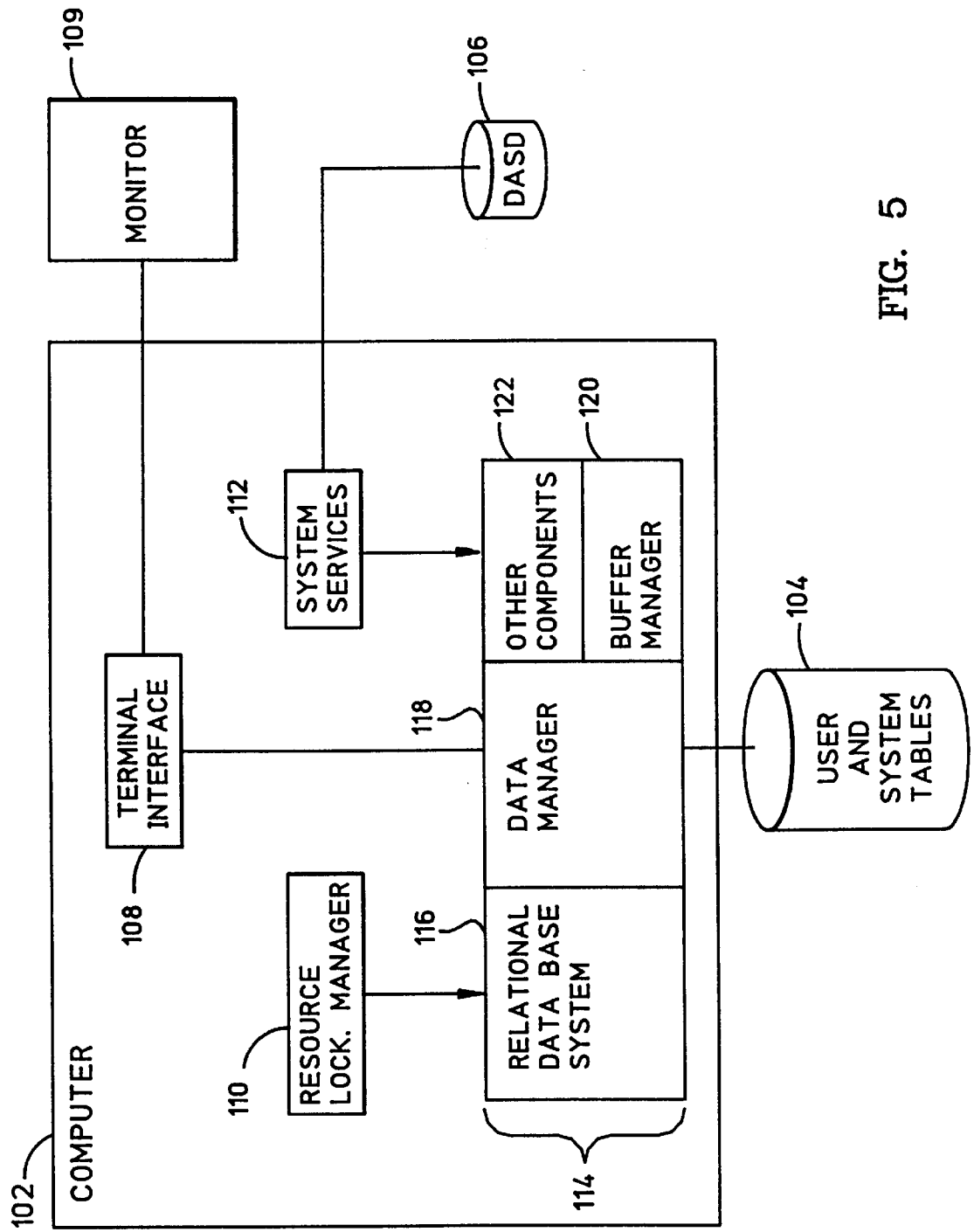
FIG. 5 is a representation of a computer processing system at a node of the FIG. 4 network that implements a relational data base management system in accordance with the present invention.

FIG. 5 illustrates a computer environment at a node 12 (FIG. 4) of the exemplary RDBMS computing system. In the exemplary computer environment, a computer system 102 at the node accesses network data storage devices, such as disk drives, in which are stored user and system tables 104 and log data tables 106. An operator of the computer system 102 uses a standard operator terminal interface 108, such as one of the interfaces known as IMS/DB/DC, CICS, TSO, OS/2, or some other similar interface, to transmit electrical signals to and from the computer system that represent commands for performing various search and retrieval functions against the databases 104, 106. The commands are viewed on a visual monitor 109. These search and retrieval functions are generally referred to as queries. In the preferred embodiment of the present invention, these queries conform to the SQL standard interface, and invoke functions performed by RDBMS software. In the preferred embodiment of the present invention, the RDBMS software comprises the "DB2" product offered by the IBM Corporation for the "MVS", "AIX", or "OS/2" operating systems. Such software generally resides in memory of network computers. Those skilled in the art will recognize that the present invention has application to any RDBMS software that uses SQL.

As illustrated in FIG. 5, the DB2 product architecture for the MVS operating system includes three major components: the Resource Lock Manager ("RLM") 110, the System Services module 112, and the Database Services module 114. The RLM handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing the log data sets 106, gathering system statistics, handling startup and shutdown operations, and providing management support.

At the center of the DB2 product architecture is the Database Services Processor module 114. The Database Services Processor module contains several submodules, including the Relational Database System (RDS) 116, the Data Manager 118, the Buffer Manager 120, and other database components 122, including an SQL compiler/interpreter. These submodules support the functions of the SQL language, such as definitions, access control, retrieval, and update of user and system data. The Database Services Processor module 114 preferably comprises one or more processors that execute a series of computer-executable programming instructions. These programming instructions preferably reside in storage locations such as fast-access memory (FIG. 4) of the computer 102. Alternatively, the instructions may be stored on a computer diskette 26 (FIG. 4), direct access storage device, magnetic tape, conventional "hard drive", electronic read-only memory, optical storage device, paper punch cards, or another suitable data storage medium containing logically segmented storage locations.

As noted above, the SQL query processor component of the RDBMS will respond to submission of a user query by providing the SQL optimizer with rewritten SQL code in a QGM representation, and the SQL optimizer will generate a QEP such that properties for each query operator of the query will be computed and will be associated with query operator requirements. Moreover, the query processor will maintain partition property information as one of the query operator properties that are considered during query optimization, so that the query optimizer will consider how the rows produced by the associated query operator, and all of its inputs, are physically partitioned across the network in performing QEP pruning and in performing look-ahead partitioning. It should be understood that an SQL optimizer is conventionally provided with system information such as the location of tables and parts of tables, the size of such tables, network node locations, system operating characteristics and statistics, and the like. In the preferred embodiment, the query processing with partition property-derived optimization can take place in either an interactive operating mode or in a batch processing mode, both of which will be described next.

Interactive SQL Execution

Figure 6:
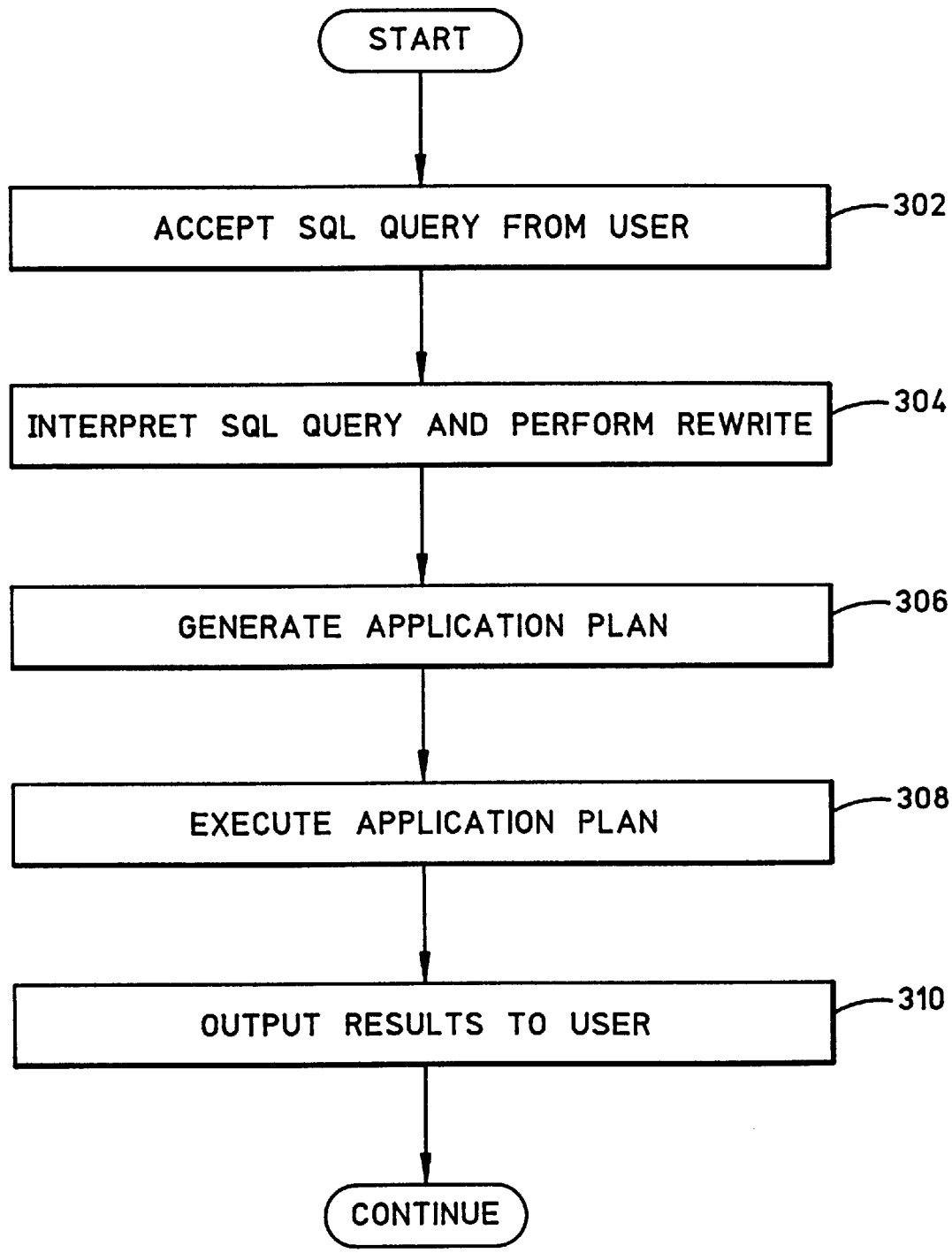
FIG. 6 is a flow diagram that illustrates the processing steps executed by the computer processing system of FIG. 5 to interpret and execute an SQL statement in an interactive environment.

FIG. 6 is a flow diagram that illustrates the operating steps necessary for the interpretation and execution of SQL statements in an interactive network environment such as shown in FIG. 4, in accordance with the present invention. These steps are implemented as computer program steps stored in one of the network computers 12, 14. The first flow diagram box of FIG. 6, numbered 302, represents the input of an SQL statement into the computer system from the user. The next flow diagram box 304 of FIG. 6 represents the step of compiling or interpreting the received SQL statement. In the preferred embodiment, this step includes an optimization function that rewrites and transforms the SQL query in a manner described in greater detail below. The FIG. 6 flow diagram box numbered 306 represents the step of generating a compiled set of runtime structures called an application plan from the compiled SQL statements.

Generally, the SQL statements received as input from the user (step 302) specify the data the user wants, in the form of a query, but do not specify how to get it. The application plan represents the computer-generated sequence of operations to obtain the data specified by the user query. Generation of the application plan involves consideration of both the available access paths (indexes, sequential reads, etc.) and system held statistics on the data to be accessed (the size of the table, the number of distinct values in a particular column, etc.), to choose what the RDBMS processor considers to be the most efficient access path for the query. The selection of the most efficient access path utilizes query, database, and system information that is conventionally available to SQL optimizers. The FIG. 6 flow diagram box numbered 308 represents the execution of the application plan. The last block 310 in FIG. 6 represents the output of the results of the application plan to the user.

Embedded/Batch SQL Execution

Figure 7:
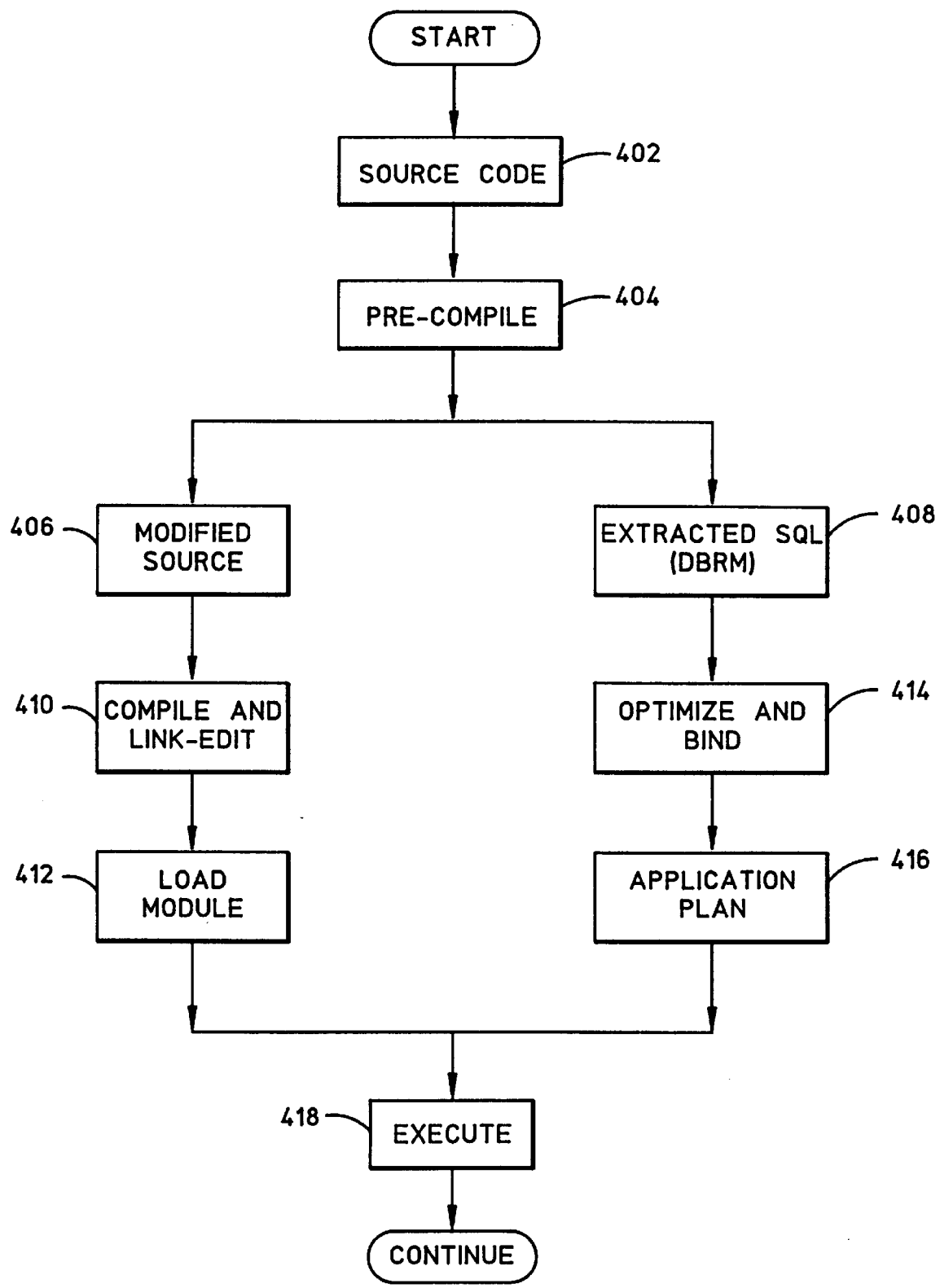
FIG. 7 is a flow diagram that illustrates the processing steps executed by the computer processing system of FIG. 5 to interpret and execute an SQL statement embedded in source code.

FIG. 7 is a flow diagram that illustrates the steps necessary for the interpretation and execution of SQL statements embedded in source code for batch operation according to the present invention. The first block 402 represents program source code containing a host language (such as COBOL or C) and embedded SQL statements that is received by the RDBMS processor for batch processing. The received program source code is next subjected to a pre-compile step 404. There are two types of output code from the pre-compile step 404: a modified SQL source module 406 and a Database Request Module ("DBRM") 408. The modified SQL source module 406 contains host language calls to the DB2 program, which the pre-compile step 404 inserts into the pre-compile output code in place of the SQL source statements. The other output of the pre-compile step, the DBRM 408, consists of the SQL statements from the program source code 402.

After the modified source 406 is produced, a compile and link-edit step 410 uses the modified source output to produce a load module 412, while an optimize and bind step 414 uses the DBRM output 408 to produce a compiled set of runtime structures for the application plan 416. As indicated above in conjunction with the description of FIG. 6, the SQL statements from the program source code 402 specify only the data that the user wants, but not how to get to it. In the preferred embodiment, the optimize and bind step 414 optimizes the SQL query in a manner described in greater detail below. The optimize and bind step then considers both the available access paths (indexes, sequential reads, etc.) and system held statistics on the data to be accessed (the size of the table, the number of distinct values in a particular column, etc.), to choose what it considers to be the most efficient access path for the query. The load module 412 and application plan 416 are then executed together at the last step, represented by the flow diagram box numbered 418.

Query Optimization in Accordance With the Invention

In accordance with the invention, the query processor of the RDBMS (FIG. 5) generates a QEP and maintains a partition property as one of the properties computed for each query operator. In particular, the partition property is maintained so as to characterize how the rows produced by the associated query operator, and all of its inputs, are physically partitioned across the network. The query optimizer can consider the partition property in performing QEP pruning and in performing look-ahead partitioning.

Defining the Partition Property

The partition property indicates the nodes over which data tables are mapped. In the preferred embodiment, this includes identification of the nodes to which rows of partial table operation results are assigned, either as a single identifier for a group of nodes or alternatively by listing each node and its mapping destination. A special value is used to designate a coordinator node, which those skilled in the art will understand refers to the node at which a user is connected. A more generalized implementation of this latter concept is to permit the user to connect to, and draw rows from, a set of such specially-designated nodes in parallel, in which case the coordinator node would actually be a set of nodes.

The partition property information maintained by the RDBMS also includes details of the partitioning function that assigns individual table rows to particular network nodes. Those skilled in the art will appreciate that this is typically implemented with a deterministic function, such as a hashing function, on a subset of the table columns called the partitioning key columns. In the preferred embodiment, the same partitioning function is used for all the columns having the same data type, so it suffices to simply record the partitioning key columns in the partitioning information.

The partitioning information can optionally include special-case flags, which are data flags that indicate whether special or degenerate forms of partitioning have occurred for various reasons. One of the reasons for special partitioning might be characterized as broadcast partitioning, wherein a flag indicates when a copy of each table row was sent to each of the partitioning nodes, rather than the typical partitioning direction of sending each table row to only one of the partitioning nodes using the partitioning function with the partitioning key columns of the row as parameters.

Another special-case flag might be characterized as a one-node flag. This is used such that, if it can be determined that all rows of a partial result will only end up on a single node of the partitioning nodes, then this flag will be set to true. For example, this flag can be true when there is a predicate that binds each of the partition key columns to a constant, including expressions on constants, host variables, and the like. In that case, all rows satisfying the query produced by this plan can be on only one node. As another example, if the partition key columns are called LAST_NAME and FIRST_NAME, and the query has in its WHERE clause the predicates:

"WHERE LAST_NAME='Smith' and FIRST_NAME='Robert'", then only the node having those values will satisfy the query. This can be exploited by sending the QEP to execute only on that node, saving work on the other nodes of the partitioning. Another way in which one node may be true is the application of a predicate that explicitly binds the result to a specific node or partition on a particular node, such as:

"WHERE NODENUMBER(DEPT_NO)=5".

Lastly, another special-case flag might be a fix-value flag, where if any one-node flag is set, this partition component flag contains the node's identifier.

It should be noted that some degenerate cases can occur. For example, the partitioning key columns may be empty. This may occur, for example, after a UNION operator, which combines the rows of two or more input streams of rows having columns of compatible data types. Since one stream may be partitioned on the column LAST_NAME and the other stream may be partitioned on the column MGRNAME, the partitioning key column of the result of the UNION is indeterminate. That is, it is really either LAST_NAME or MGRNAME, depending upon the stream from which the row originated. Recording the partition property for each row would effectively be impossible at compile time, and practically speaking would be too voluminous.

Another such degenerate case can occur when the broadcast flag is true. By definition, broadcast rows are not partitioned but are replicated over all nodes, so the partition key columns are meaningless. An identifier could be included to identify the partitioning function, if it were desirable to use a different such function for different tables or for partial results. In the preferred embodiment, the partitioning function is the same for all tables and partial results on columns having the same data type comprising a hashing function on the partitioning key columns, so this is not necessary.

Pruning Alternative QEPs Based on the Partition Property

Figure 8:
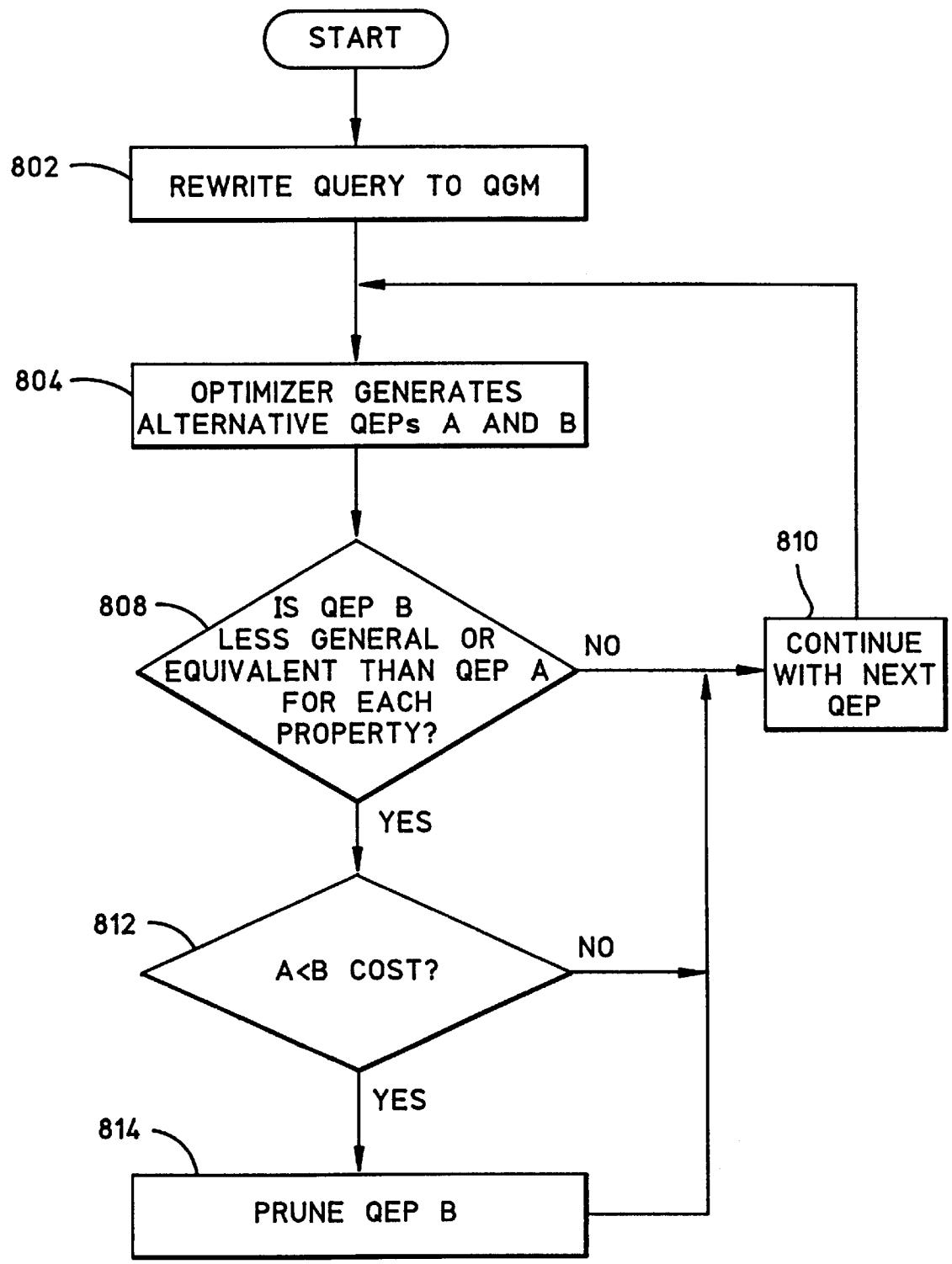
FIG. 8 is a flow diagram that illustrates the processing steps executed by the computer processing system of FIG. 5 to implement pruning of alternative QEPs considering the partition property, in accordance with the present invention.

FIG. 8 is a flow diagram that represents the processing steps executed by the computer processing system of FIG. 5 to implement pruning of alternative QEPs during query optimization according to the invention, considering the partition property. Because a given SQL statement can be executed many different ways, most conventional query optimizers generate many potential QEPs to execute a query. During the query optimization process, the potential QEPs are compared and the more costly QEPs with otherwise comparable properties are pruned. A similar pruning process can be conducted for partial results as each QEP is built. It is desirable, and for large queries it is necessary, to prune sub-optimal query plans, to bound the time and space complexity of the query optimization task.

As noted above, query optimization involves rewriting the SQL query received from a user at a system node into the query graph model (QGM) representation for further processing, a step that is represented by the FIG. 8 flow diagram box numbered 802. Further processing of the QGM by the query optimizer results in the generation of alternative QEPs that will be referred to in this description as QEP A and QEP B. Generating two QEPs A and B is indicated in FIG. 8 by the flow diagram box numbered 804. For any two alternative QEPs, the next step is to investigate the properties of the respective plans and determine whether one of them should be pruned. For purposes of this description, the decision is being made with respect to elimination of QEP B, but those skilled in the art will recognize that either alternative plan can be the object of the pruning decision. The processing of the flow diagram boxes numbered 808 through 814 implement the QEP B pruning.

In general, two potential query execution plans can be compared based upon their estimated execution cost and their distinguishing properties, and the more expensive cost plan can be pruned if it is less general or equivalent to the alternative plan for every distinguishing property. The present invention recognizes that the partition property is a distinguishing property that can be used to control pruning, because two plans having different partition properties may not be equivalent. On the other hand, it could be that a query plan having a table with partition property "P1", while more expensive to evaluate than a query plan having a table with a partition property "P2", might benefit from having the partition property "P1" later in the plan.

For example, consider the following query that asks for the average salary of all employees by age at a particular site:

Query 1

SELECT AVG(E.sal)
FROM EMP E, DEPT D
WHERE E.dno=D.dept no_AND D.location='SAN JOSE'
GROUP BY E.age Suppose that the table EMP is partitioned on column AGE, and the table DEPT is partitioned on column DEPT_NO. One plan to perform the join of EMP and DEPT (plan A) might direct the rows of EMP according to the partitioning of table DEPT, by repartitioning on column EMP.dno (the join column). Another possible join plan (plan B) might be to broadcast the rows of table DEPT to all nodes of table EMP. Depending upon the relative sizes of the two tables, join plan B that broadcasts DEPT's rows might, by itself, be more expensive than plan A directing the rows of EMP to those of DEPT. However, the broadcast plan will, after the join, have the partition property of the non-broadcast input, that is, column AGE, which is just what is needed for the aggregation on AGE. Plan A will have the partition property of the join column (DNO and, equivalently, DEPT_NO), and so will have to be repartitioned on column AGE to accomplish the aggregation. So, in total cost to satisfy the entire query, plan B could be cheaper than plan A, even though plan B was more expensive to perform just the join. This consideration is accounted for in pruning by the notion of generality, which was described above and will be explained further with respect to FIG. 8 and QEP A and QEP B.

The first step of determining whether QEP B should be pruned, represented by the decision box numbered 808, is for the query optimizer to determine if QEP B is less general than QEP A. As noted above, if the symbol "<=" is used for distinguishing properties to mean "less general or equivalent", then QEP A prunes QEP B if A.cost is less than or equal to B.cost and for every distinguishing property x, A.x <=B.x. In other words, QEP B can be pruned and eliminated from further consideration if it costs more than QEP A and has less general properties for every distinguishing property.

Thus, at the decision box numbered 808, if QEP B is not less general than or equivalent to QEP A for each and every property being considered, a negative outcome at the decision box, then QEP B should not be pruned, and processing proceeds to the continuation box numbered 810, from where processing (query optimization) returns to the box numbered 804. If QEP B is less general than or equivalent to QEP A, an affirmative outcome at the decision box 808, then the optimizer next checks to determine if QEP A has a lower cost than QEP B. The cost considering step is represented by the decision box numbered 812. If QEP A is not lesser cost, a negative outcome, then QEP B is not pruned and processing moves to the continuation box 810. If QEP A is lesser cost, an affirmative outcome at the box 812, then QEP B is pruned, as represented by the flow diagram box numbered 814. Query optimization processing then proceeds with the continuation box numbered 810.

A pseudocode description for the query optimizer processing illustrated in FIG. 8 is provided below in Table 2:

Table 2

B_less_general=False;
FOR each table property x
   IF B.x<=A.x
      B_less_general=True;
   IF B_less_general and A.cost<=B.cost,
      THEN Prune=True;
   IF Prune=True, THEN Prune B,
      ELSE next QEP;

In Table 2, the pseudocode term B_less_general represents the outcome of a test to determine whether QEP B is less general than or equal to another plan. Thus, for pruning, it suffices to define the generality relation operator "<=" for each distinguishing property. There is, however, no conventional definition of a relational operator for the table partition property. One way to determine "<=" for the partition property is to test if all partition components of the respective two partition classes are identical. The partition property for any two QEPs involving tables is specified by the set of nodes over which the respective QEP tables are partitioned, the function used to assign the table partitions to the nodes, and the key provided to the function. That is, the "<=" generality relation operator can be determined for the partition property if the pseudocode of Table 3 results in a "true" evaluation:

Table 3

IF B.nodes=A.nodes
   AND B.flags=A.flags
   AND B.#partition_cols=A.#partition_cols
   AND each B.partition_col EQUIVALENT to corresponding A.partition_col It should be noted that the requirement on the partitioning key columns is not that they be identical, but that their values be equivalent. That is, the requirement is that there be a predicate that equates their values such that WHERE B.partition_col=A.partition_col.

In the preferred embodiment, a more general procedure is used, where the QEP A is treated as a required partition property and the query optimizer determines if the QEP B can satisfy that requirement.

Determining the Partition Property

Each query plan operator is associated with a property; each type of plan operator has a predetermined effect on all properties, including the partition property. The partition property can be specified by one or more arguments of a plan operator. The effect may be no effect at all; that is, an operator may leave the property unchanged. For example, the SORT plan operator changes the ordering property to be whatever columns were specified as the "sort key columns" argument. But the SORT operator does not affect the partitioning of the result, so it leaves the partition property unchanged.

Every property that needs to take on a specific value needs at least one operator that can produce the desired value. For the partition property, that operator is the table queue (TQ) operator. The primary function of the TQ operator is to repartition rows from a source partitioning to the target positioning that is given in the TQ's arguments. For example, suppose a table called EMPLOYEE is partitioned on a column LAST_NAME over nodes 1, 3, and 5. Such a partitioning means that all query plans that access this table will have a partition property specified as ({1, 3, 5}, LAST_NAME). Next, suppose the rows of the EMPLOYEE table are involved in an operation that requires its rows instead be partitioned over nodes 2, 4, and 6, and on the column DEPT_NO. To accomplish this relocation, a TQ operation having a partition argument equal to ({2, 4, 6}, DEPT_NO) would have to be added after any partial QEP accessing the EMPLOYEE table. The output of this TQ would then have a partition class specified as ({2, 4, 6}, DEPT_NO), even though its input partition property (the output partition property of the previous operator that is providing the TQ input) had a partition property of ({1, 3, 5}, LAST_NAME). Now, if the broadcast flag mentioned above was set in the partition argument of the TQ, then the rows of the input stream would be broadcast to all the nodes in the target partition class specified in the partition argument.

The TQ operator may affect other properties in addition to affecting the partition property as described above. For example, the TQ operator eliminates the order property, because rows would arrive at each target node from sending nodes in a random order. To preserve the order property while also changing the partition property, a variation of the TQ operator called a merging TQ can be used. The merging TQ is denoted by a merging argument specified with the TQ operator that indicates the sending nodes have ordered their rows on certain columns, and that this ordering should be preserved by the receiving nodes. This is accomplished by each receiving node getting one row destined for it from each sending node and by reading the low-order row.

Other operators may modify a partition class indirectly. For example, any operator that can apply a predicate can cause the one-node flag of the partition property to be set to an "on" value, if the predicate it applies completes the binding of all the partition property's partitioning key columns. For example, suppose the predicate

WHERE LAST_NAME='SMITH' had already been applied as part of an index scan on the column LAST_NAME in the table EMPLOYEE. Subsequently, the FETCH operator is used to access the column FIRST_NAME, at which time the predicate WHERE FIRST_NAME='Robert' can be applied. At this point, all the partitioning key columns have been bound to constants by the application of predicates, so the single-node component of the partition class output by the FETCH operator is set to an "on" value. Finally, as noted above, the UNION operator combines streams that may be partitioned on different partition key columns, and hence outputs a partition property that has no partition key columns. Similarly, if any of the partition key columns are not referenced in a query against that table, then the partition key columns are not relevant to the processing of the query, because the partitioning cannot be exploited in its processing. It is therefore treated as random, which is denoted by the absence of partition key columns in the partition property.

Partition Requirements

Executing operations in parallel speeds response time, so has significant performance benefits. To exploit this capability, certain operations require that data be partitioned in a certain way. For example, a parallel join operation requires that both input tables have equivalent partitioning properties. This is referred to as a partition requirement, and it can be denoted using the same information as a partition property.

Because query operators may require a particular partition property before they can operate in parallel, every property that must take on a specific value needs at least one operator that can produce the desired property. For the partition property, that operator is the TQ (table queue) operator, also called the Repartition Producer (RP) operator. Its primary function is to repartition rows from a source partitioning to a target partitioning that is given in the arguments of the TQ operator. As an example, suppose an EMP table of employee data is partitioned on a column LAST_NAME over nodes 1, 3, and 5. That is, all plans that access this table will have a partition property specified by ({1,3,5}, LAST_NAME). Now suppose that the rows of EMP are involved in an operation that requires that its rows instead be partitioned over nodes 2, 4, and 6 on a column DEPT_NO. To accomplish this relocation, a TQ having a partition argument ({2, 4, 6}, DEPT_NO) would then have to be added after any partial QEP accessing EMP. This TQ would then have an (output) partition class of ({2, 4, 6}, DEPT_NO), even though its input partition property (the output partition property of the previous operator that is providing the TQ's input) was ({1, 3, 5}, LAST_NAME). If a broadcast flag was set in the partition argument of the TQ operator, then rows of the input stream would be broadcast to all the nodes in the target partition class specified in the partition argument.

A partitioning property is said to satisfy a partitioning requirement if the two are equivalent after the partitioning requirement has been cast to a partitioning property. Queries are broken into subtasks in accordance with how the database is partitioned. Optimization choices regarding how queries are broken into subtasks are driven by how the data is partitioned, or by the partitioning property of the data. Often data has to be repartitioned dynamically during query evaluation to satisfy the partitioning requirements of a given query operation. Repartitioning is an expensive operation and should be optimized or avoided altogether. One of the main parallel query optimization goals of the present invention is to optimize repartitioning of data by recognizing the possible partitioning requirements for achieving parallelism for a query operation, and by recognizing when the partitioning property of data satisfies the partitioning requirements of a query operation.

Thus, if a plan results in a partitioning property that satisfies a partitioning requirement of a later query operation, then the query processor in accordance with the present invention recognizes that no further repartitioining is required. If no plan satisfying a partitioning requirement exists, then a TQ operator must be added to one or more existing plans, and the partitioning requirement is passed as an argument to the TQ operator. Under certain circumstances, parts of the partition requirement may be unspecified or denoted as a maximal requirement, for which any variation or subset may suffice. For example, a final aggregation step is unnecessary if data is partitioned such that all rows for the same group of the aggregation (GROUP BY) are on one node. This happens when the partitioning key columns of a partial result are a subset of the grouping columns. Under such circumstances, the nodes are not necessarily of any importance. To indicate these degrees of freedom, the partitioning requirement will contain a "wildcard" value for the nodes. In addition, it contains an additional component which indicates that any subset of the partitioning key columns are permitted.

Unlike the join operation, which requires that input tables have equivalent partitioning properties, certain operations require only that input streams be partitioned on the same set of nodes. For example, a UNION operation can be carried out in parallel without regard as to how its input streams are assigned to those nodes. Consequently, the partitioning requirement for an input to the UNION operation need not specify the partitioning key. This is called a "scatter" partitioning. The effect of this requirement is that each row will be randomly assigned to one of the nodes specified, but not based upon any values within that row, because it doesn't matter which node does the work (unlike most other operators, such as joins).

Interesting Partition Classes

Described above is the procedure by which the query optimizer of the present invention can consider the partition property during query plan optimization. In accordance with the invention, the query optimizer also can operate during a preoptimization phase (prior to query optimization) to collect partition requirements that have been designated to be of interest and, if appropriate, reduce the complexity of the subsequent optimization. Those skilled in the art will understand that the preoptimization phase is conventionally used to accomplish optimization tasks prior to query plan evaluation.

What will be referred to as "interesting partition classes" should be understood to mean any partition classes that the query optimizer can use during the optimization phase to reduce the complexity of optimization, as well as to produce execution plans that are closer to optimal, and should be understood to refer to any partitioning of the data that may prove useful for executing a query. For example, consider a query containing the following clause:

GROUP BY EMP.AGE, EMP.DEPT_NO.

Such a query would generate the following interesting partition classes listed in Table 4:

Table 4

(EMP.AGE)
(EMP.DEPT_NO)
(EMP.AGE, EMP.DEPT_NO)
(EMP.DEPT_NO, EMP.AGE)

These partition classes are designated "interesting" partition classes because a query plan A with any one of these classes as its partition property will satisfy the partitioning requirement of the GROUP BY operation. Using the plan A, the GROUP BY operation can therefore be executed in parallel without any data movement across nodes. In contrast, if another query plan B had (EMP.LAST_NAME) as its partition property, then data movement would be required to compute the GROUP BY operation. By maintaining a list of interesting partition classes, the query optimizer of the RDBMS in accordance with the invention can detect that the query plan A satisfies the partitioning requirement of the GROUP BY operation. Therefore, all other things being equal, the query plan A would be preferred over the query plan B, because plan A would not require any data movement.

Figure 9:
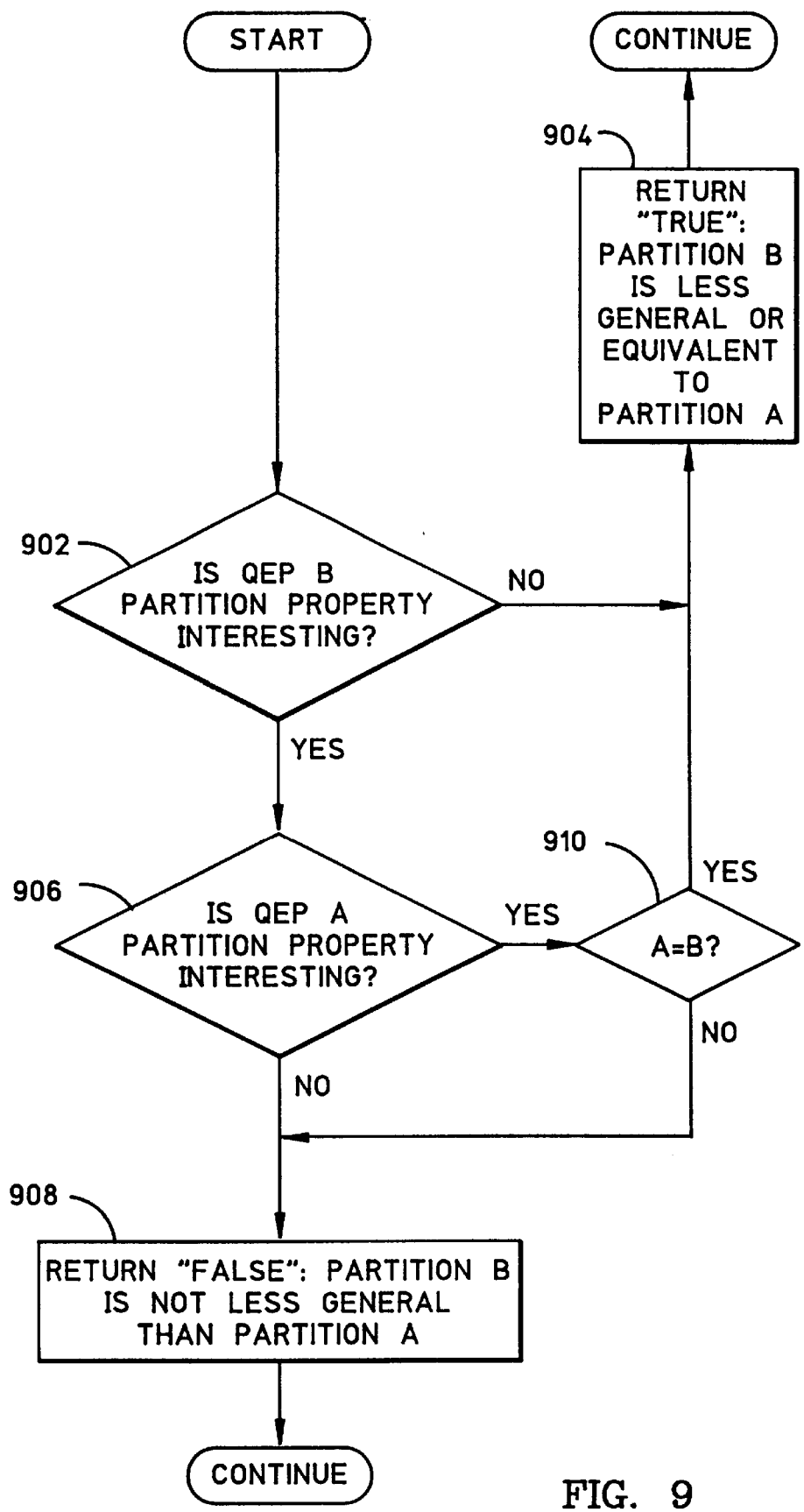
FIG. 9 is a flow diagram that illustrates the processing steps executed by the computer processing system of FIG. 5 to determine whether one partition property is more general than another.

FIG. 9 is a flow diagram that illustrates the processing steps executed by the computer processing system of FIG. 5 to consider designated interesting partition classes and to determine whether one plan is less general than another, for pruning during the preoptimization phase referred to previously. It should be noted, however, that consideration of interesting partition classes is not restricted to processing during preoptimization, rather, they may be considered at any time during query optimization before execution. It is advantageous to consider interesting partition classes during preoptimization because the optimizer already examines different query subplans during the preoptimization phase and prunes more costly subplans with comparable properties. The pruning is necessary to bound the time and space complexity of query optimization, which otherwise would be intractable.

Without using "interesting" partition classes, the pruning would have to be performed either ignoring partition classes or by being limited to comparing two subplans only if they had the same partition class (see Table 3). Ignoring partition classes sacrifices optimality, while comparing only in the presence of identical classes requires class checking that increases the complexity of optimization. As noted above, the present invention determines that a plan QEP B is less general than or equivalent to a plan QEP A if QEP B is less general than or equivalent to QEP A for each property, including the partition property.

Using interesting partition classes in accordance with the invention, as illustrated in FIG. 9, permits more efficient pruning. In the first step of the "interesting class" processing where two query subplans QEP A and QEP B are compared, the query optimizer checks to determine if the partition property for QEP B has been designated an interesting class. This checking is represented by the flow diagram box numbered 902. If the QEP B partition property is not an interesting class, a negative response at the decision box 902, then QEP B is less general or equivalent and this result is returned for consideration (see the "YES" outcome at the decision box 808 of FIG. 8). The indication that QEP B is less general is indicated at the flow diagram box numbered 904, and processing continues with further subplan optimization by considering other plans.

If the QEP B plan is an interesting class, an affirmative outcome at the decision box 902, then the query optimizer next checks to see whether the QEP A plan partition property is an interesting class. If the QEP A partition class is not interesting, a negative outcome at the decision box 906, then the query optimizer indicates that QEP B is not less general than QEP A, as indicated by the flow diagram box numbered 908, and this result is returned for consideration (see the "NO" outcome at the decision box 808 of FIG. 8). Processing continues with further optimization. If the QEP A partition is an interesting class, then the query optimizer checks at the box numbered 910 to determine if the partition class for the two plans are equivalent. This is the processing described above in Table 3. In FIG. 9, if A and B are equivalent, an affirmative outcome, then B is less general than or equivalent to A. If A and B are not equivalent, then the query optimizer indicates that B is not less general than A at the box numbered 908.

A pseudocode description for the query optimizer processing illustrated in FIG. 9 is provided below in Table 5:

Table 5

IF (B.part is not interesting) THEN
   RETURN TRUE;
ELSE IF (A.part is not interesting) THEN
   RETURN FALSE;
ELSE IF (B.part and A.part are equivalent) THEN
   RETURN TRUE;
ELSE
   RETURN FALSE.

The general case of this processing can be described as follows: let A and B be two plans being compared. Let "<=" represent a relation in which one property is less general or equivalent to a following property. Then the B plan prunes the A plan if $$B.cost <= A.cost$$

and for every property x, $$A.x <= B.x,$$

meaning that plan A can be pruned if it has a higher cost than plan B and has less general properties. Thus, for pruning, it suffices to define the "<=" relation for each property to be encountered. The partition property is tested according to the flow diagram of FIG. 9 and the pseudocode of Table 5.

Using such processing, it is possible for the query optimizer to prevent a subplan such as A with an interesting partition property from being pruned by a subplan B having a lower cost but with an uninteresting partition property. This feature of the invention is important because the A plan, having an interesting partition property, could eventually lead to a better execution plan than B, due in part to the fact that less data movement would be required. Without considering interesting partition classes and therefore without making these further considerations, a query optimizer might otherwise produce a sub-optimal execution plan. Another benefit of the "interesting class" processing is that the complexity of query optimization is reduced. This result is achieved because any subplan with an uninteresting partition class can be compared and pruned on the basis of other properties. That is, the partition property can be ignored during pruning, unless it is an interesting class.

Generating Interesting Partition Classes

Any partitioning of the data that may prove useful for executing a query can be used to define and generate an interesting partition class. Interesting partition classes can be generated and stored in the preoptimization, but alternatively can be generated and stored in the optimization phase. As an alternative, the interesting partition classes can be generated as needed, as plans are generated. In either case, the query and the partitioning of tables that are referenced in the query dictate the interesting partition classes.

In the case of the "DB2" system by IBM Corporation, various SQL operators can be associated with the following interesting partition classes, listed in Table 6:

Table 6

INSERT, UPDATE, DELETE
   Generates an interesting partition class for the target table of the insert, update, or delete, respectively. That is, an interesting partition class that is equivalent to the partition property of the target table.
UNION
   Generates an interesting partition class for the largest input table of the UNION operation. The goal is to minimize data movement by leaving the largest input table alone and directing the other input tables to it.
GROUP BY
   Generates multiple interesting partition classes, one for each possible subset of the grouping columns (in any order). Any of these will satisfy the partitioning requirement of the GROUP BY operator.
DISTINCT
   This is similar to the GROUP BY, and generates an interesting partition class for each possible subset of the DISTINCT columns, in any order. Any of these will satisfy the partitioning requirement of the DISTINCT operator.
JOIN
   Generates an interesting partition class for each input of the JOIN. This is to generate interesting partition classes for the case in which the join can be directed to one input table or the other; that is, a directed JOIN. This also generates an interesting partition class for each combination of join columns, to generate interesting partition classes for the case in which the input tables are repartitioned on some join predicate (a repartition join).

Other interesting partition requirements can be generated by other operations.

Partition Ahead and Interesting Partition Classes

Interesting partition classes can also be used for what will be referred to as "look ahead" partition processing, or simply partition ahead. In accordance with the invention, the query optimizer can generate a query plan whose partition property satisfies the partition requirement of an upcoming operation. In partition ahead processing, the query optimizer looks at the interesting partition classes generated by an operation and uses interesting partition classes to determine the network node partition across which a table should be distributed to have a partition property needed for future operations.

Figure 10:
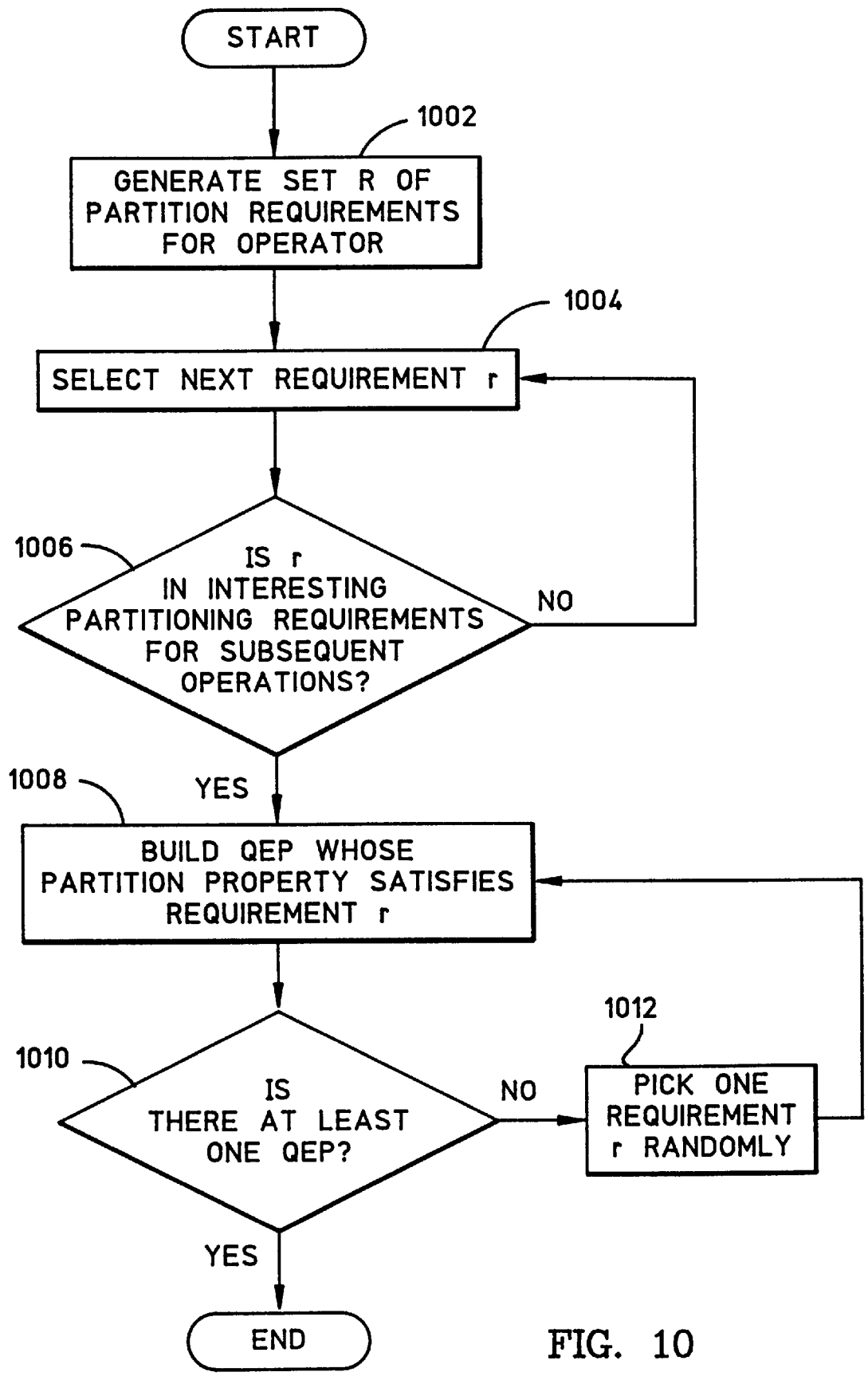
FIG. 10 is a flow diagram that illustrates the processing steps executed by the computer processing system of FIG. 5 to implement look-ahead partitioning control.

FIG. 10 is a flow diagram that illustrates the processing steps executed by the computer processing system of FIG. 5 to implement look-ahead partitioning when generating plans for a particular operator O, exploiting the interesting partition requirements generated during preoptimization, and Table 7 below is pseudocode that corresponds to the FIG. 10 processing. The first step is for the query optimizer to generate the set R of all possible partition requirements for that operator. This corresponds to the FIG. 10 flow diagram box numbered 1002. The second step is for the query optimizer to iterate through all such requirements R, and for each such requirement r in that set R, build a QEP having a partition property that satisfies requirement r if and only if requirement r is also in the interesting partition requirements for operations subsequent to operation O. This processing corresponds to the FIG. 10 loop comprising boxes 1004–1008. The final step is for the query optimizer to determine if any plans have yet been generated by the previous two steps. This is represented by the decision box numbered 1010. If so, nothing more need be done. If no plans have yet been generated, then at least one plan must be generated by choosing at random a sinle requirement r from the set R and generating a QEP whose property satisfies requirement r (box 1012). The corresponding pseudocode is listed below:

Table 7

Collect set R of partitioning requirements for current operation FOR each requirement r in R:
  IF (r is a member of the set of interesting partition requirements for subsequent operations);
    Build QEP whose partition property is equivalent to r;
  ENDIF
endFOR
IF (no QEP generated yet)
  Pick one r in set R randomly;
  Build QEP whose partition property is equivalent to r
  endIF The partition ahead processing may be better understood with examination of the following query in Table 8:

Table 8

SELECT EMP.AGE, SUM(EMP.SALARY)
FROM EMP, DEPT
WHERE EMP.DEPT_NO=DEPT.DEPT_NO
  AND DEPT.LOCATION='san jose'
GROUP BY EMP.AGE For the sake of example, assume EMP is partitioned on EMP.AGE, while DEPT is partitioned on DEPT.LOCATION. By looking at the interesting partition classes generated by the GROUP BY operation, the query optimizer could try a partition-ahead broadcast join operation on EMP.AGE and, depending on the size of EMP and DEPT, this could result in the best execution plan. Without the exploitation of interesting partition classes, the join operation would simply generate a partitioning requirement based on the join column (i.e., DEPT_NO), so that the join results would have to be repartitioned before the GROUP BY operation. Thus, use of interesting classes can result in more efficient table partitioning.

Advantages of the Invention

The present invention provides a relational database management system (RDBMS) with a query processor containing a general mechanism, called a partition property, for developeing correct plans that minimize the need to repartition data by ensuring that parallel operations are provided data that is partitioned correctly for the execution of that operation. The present invention also uses the partition property to perform QEP pruning based on considerations derived from the partition property. The query processor also makes use of partition classes that are designated "interesting classes" to perform preoptimization planning and query pruning, and to perform look-ahead partitioning based on partition classes that are identified as being of interest to future operations. In this way, the relational database management system more efficiently evaluates complex query statements in an MPP, shared-nothing environment.

The present invention has been described above in terms of a presently preferred embodiment so that an understanding of the present invention can be conveyed. There are, however, many configurations for SQL-processing relational data base management systems not specifically described herein but with which the present invention is applicable. The present invention should therefore not be seen as limited to the particular embodiments described herein, but rather, it should be understood that the present invention has wide applicability with respect to SQL-processing relational data base management systems generally. All modifications, variations, or equivalent arrangements and implementations that are within the scope of the attached claims should therefore be considered within the scope of the invention.

We claim:

1. A method of processing a query in a relational database management system that operates in a computer network to retrieve data from computer storage, the method comprising:
  receiving a query for retrieving data stored in partitioned data tables, the query being associated with an operator and one or more subsequent operators for execution of the query;
  generating a plurality of interesting partition requirements for the one or more subsequent operators of the query;
  generating a set of possible partition requirements for the operator of the query;
  for each possible partition requirement generated for the operator:
    determining whether the possible partition requirement is the same as one of the interesting partition requirements generated previously for the one or more subsequent operators; and
    creating an alternative evaluation plan having a partition property that satisfies the possible partition requirement if it is determined that the possible partition requirement is the same as one of the interesting partition requirements generated previously for the one or more subsequent operators.

2. The method according to claim 1 wherein, for each possible partition requirement, creating an alternative evaluation plan further comprises creating an alternative evaluation plan if and only if the possible partition requirement is the same as one of the interesting partition requirements generated for the one or more subsequent operators.

3. The method according to claim 1, further comprising:
  if no alternative evaluation plans for the query exist after performing the determining for each possible partition requirement:
    selecting one of the possible partition requirements; and
    creating an alternative evaluation plan that satisfies the selected partition requirement.

4. The method according to claim 1, further comprising:
if no alternative evaluation plans for the query exist after performing the determining for each possible partition requirement:
   randomly selecting one of the possible partition requirements; and
   creating an alternative evaluation plan that satisfies the randomly selected partition requirement.

5. The method according to claim 1, wherein generating the plurality of interesting partition requirements comprises generating the plurality of interesting partition requirements during a preoptimization phase.

6. The method according to claim 1, wherein the query comprises a Structured Query Language (SQL) query.

7. A relational database management system comprising:
a central processing unit of a computer network; and
a query processor that operates in the computer network to evaluate queries and retrieve data from computer storage, wherein the query processor is operative to perform query evaluation by receiving a query for retrieving data stored in partitioned data tables, where the query is associated with an operator and one or more subsequent operators for execution of the query; generating a plurality of interesting partition requirements for at least the one or more subsequent operators of the query; generating a set of possible partition requirements for the operator of the query; for each possible partition requirement generated for the operator: determining whether the possible partition requirement is the same as one of the interesting partition requirements generated previously for the one or more subsequent operators; and creating an alternative evaluation plan having a partition property that satisfies the possible partition requirement if it is determined that the possible partition requirement is the same as one of the interesting partition requirements generated previously for the one or more subsequent operators.

8. The relational database management system according to claim 7, wherein the query processor is further operative to perform query evaluation by creating an alternative evaluation plan if and only if the possible partition requirement is the same as one of the interesting partition requirements for the one or more subsequent operators.

9. The relational database management system according to claim 7, wherein the query processor is further operative to perform query evaluation by, if no alternative evaluation plans for the query exist after performing the determining for each possible partition requirement: selecting one of the possible partition requirements; and creating an alternative evaluation plan that satisfies the selected partition requirement.

10. The relational database management system according to claim 7, the query processor being further operative to perform query evaluation by generating the plurality of interesting partition requirements during a preoptimization phase.

11. The relational database management system according to claim 7, wherein the query processor is further operative to perform query evaluation in connection with Structured Query Language (SQL) queries.

* * * * *